March 16, 1954
L. U. EYERLY
2,672,339
AUTOMOBILE RACE TRACK ROUNDABOUT
Filed March 29, 1952
4 Sheets-Sheet 1
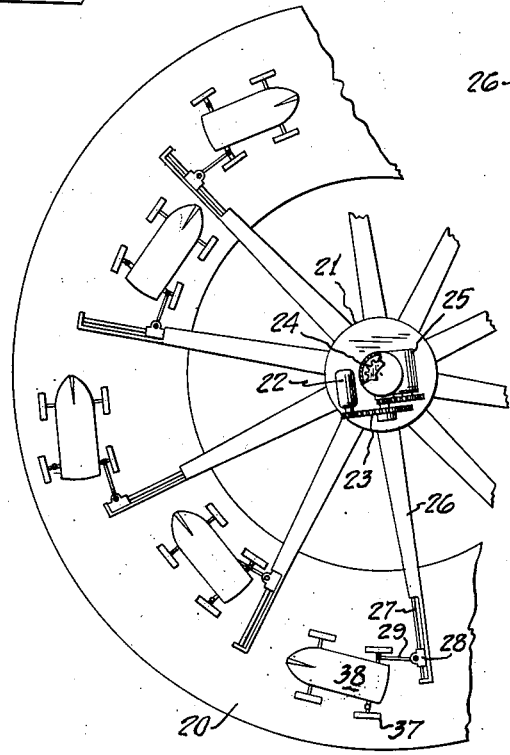
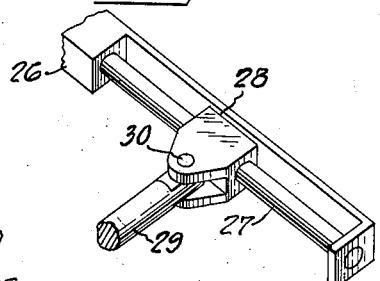
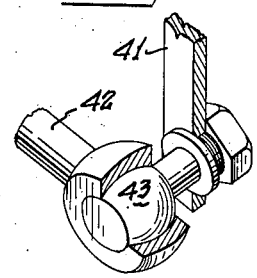
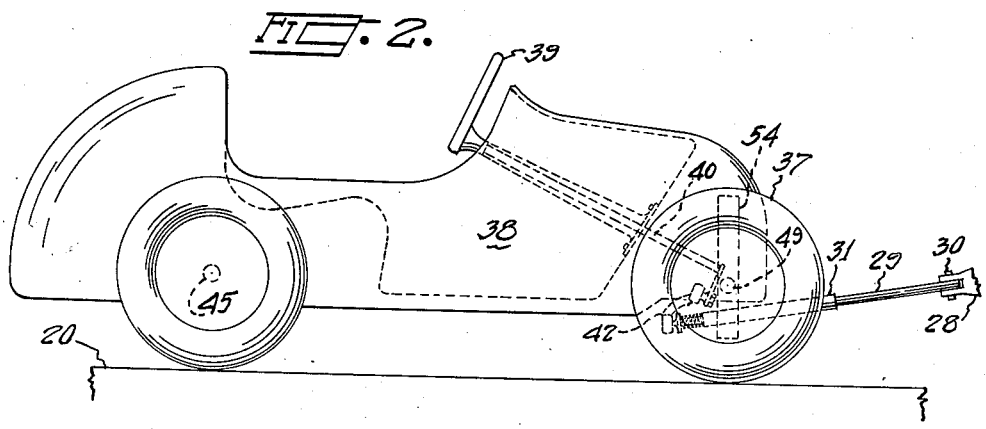
INVENTOR
LEE U. EYERLY
BY
ATTORNEY March 16, 1954
L. U. EYERLY
2,672,339
AUTOMOBILE RACE TRACK ROUNDABOUT
Filed March 29, 1952
4 Sheets-Sheet 2
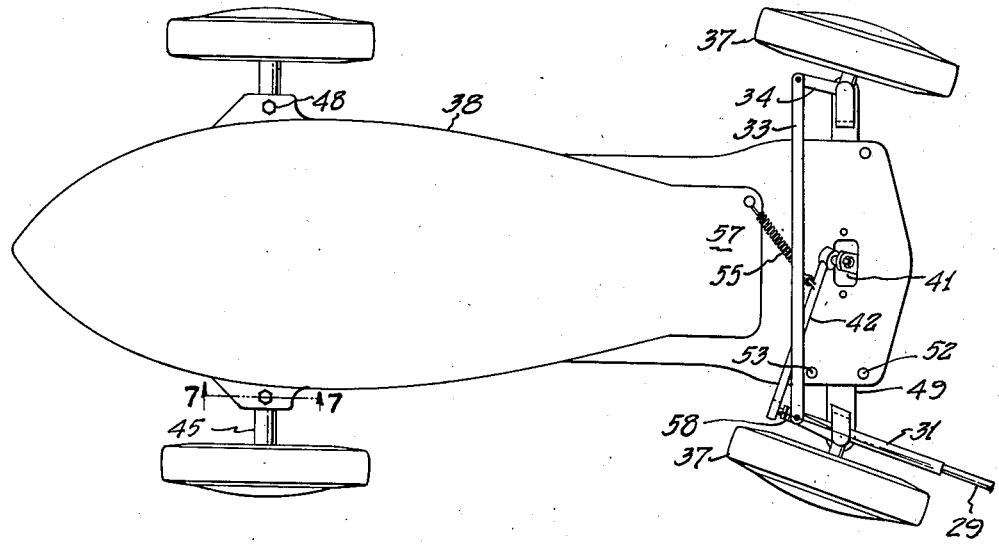
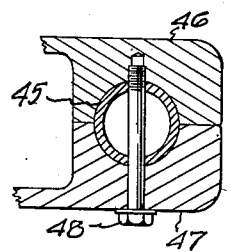
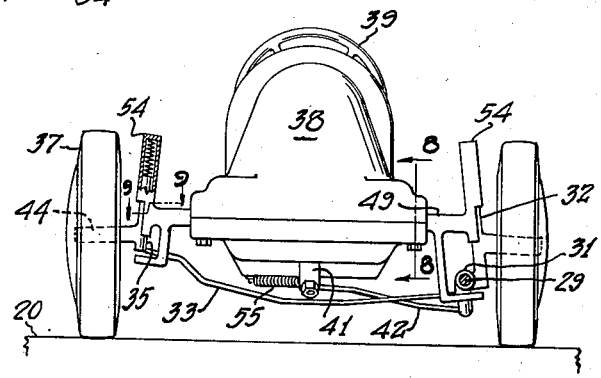
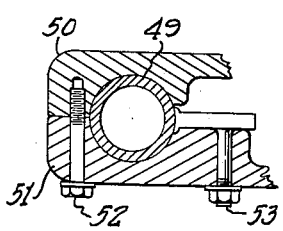
INVENTOR
LEE U. EYERLY
BY
ATTORNEY March 16, 1954     L. U. EYERLY     2,672,339
AUTOMOBILE RACE TRACK ROUNDABOUT
Filed March 29, 1952     4 Sheets-Sheet 3

INVENTOR
LEE U. EYERLY

ATTORNEY

March 16, 1954      L. U. EYERLY      2,672,339
AUTOMOBILE RACE TRACK ROUNDABOUT
Filed March 29, 1952      4 Sheets-Sheet 4
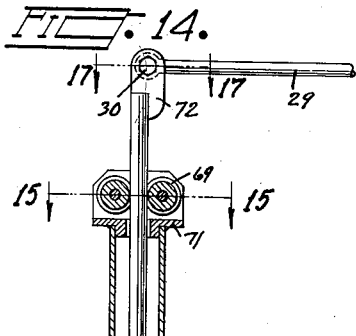
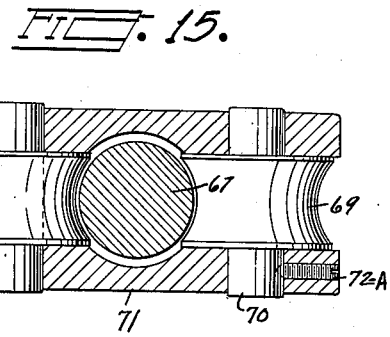
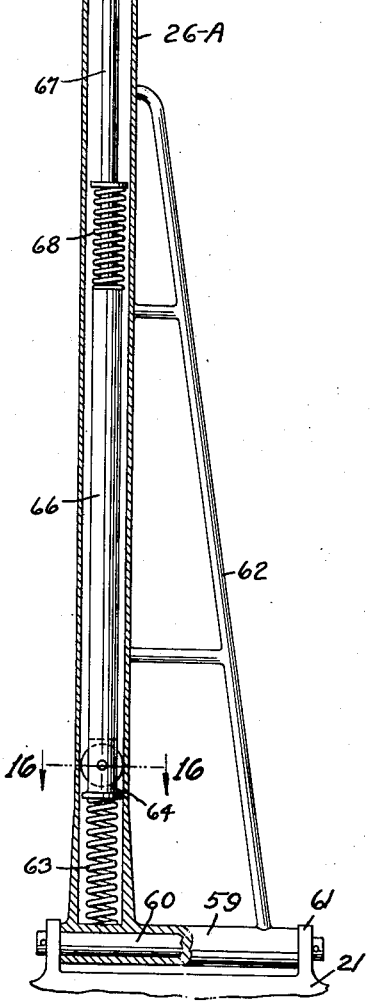
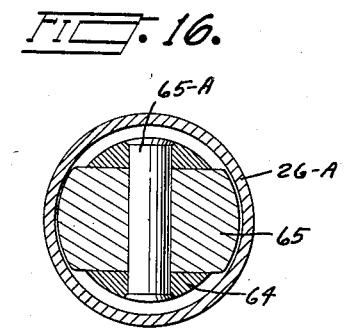
INVENTOR
LEE U. EYERLY
BY
ATTORNEY Patented Mar. 16, 1954

2,672,339

UNITED STATES PATENT OFFICE 2,672,339

AUTOMOBILE RACE TRACK ROUNDABOUT

Lee U. Eyerly, Salem, Oreg.

Application March 29, 1952, Serial No. 279,290

3 Claims. (Cl. 272—43)

This invention relates generally to amusement devices and particularly to an automobile race track.

The main object of this invention is to provide an automobile race track for children on which they may enjoy all of the thrills of racing without any danger of injury to themselves or to their cars.

The second object is to so construct the device that the racing cars may be steered by the drivers only when in movement but causing the car to be automatically steered back to the inside rail at low speeds where it must remain while at rest.

A further object is to permit the driver to steer the car back and forth radially while causing him to hold his position around the track.

I accomplish these and other objects in the manner set forth in the following specifications as illustrated in the accompanying drawings, in which Fig. 1 is a fragmentary plan of the device showing the various positions the racing car may assume.

Fig. 2 is a side elevation of a car at an enlarged scale.

Fig. 3 is a perspective view of the end of a tow arm.

Fig. 4 is a perspective view of a spherical connection for a steering link.

Fig. 5 is a front elevation.

Fig. 6 is a bottom view of the car.

Fig. 7 is a section taken along the line 7—7 in Fig. 6.

Fig. 8 is a section taken along the line 8—8 in Fig. 5.

Fig. 9 is a section taken along the line 9—9 in Fig. 5.

Fig. 14 is a horizontal longitudinal section through a modified form of tow arm.

Fig. 15 is a transverse section taken along the line 15—15 in Fig. 14.

Fig. 16 is a transverse section taken along the line 16—16 in Fig. 14.

Fig. 17 is a section taken along the line 17—17 in Fig. 14.

Like numbers of reference refer to the same or similar parts throughout the several views.

Figure 12:
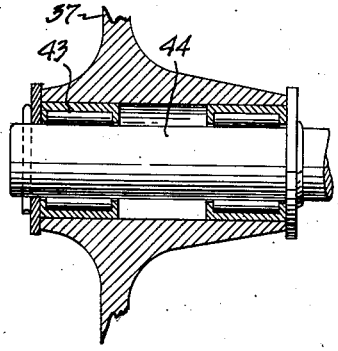
Fig. 12 is a section through a wheel hub showing the bearings.

Referring in detail to the drawings, there is shown a circular track 20 which may be dished if desired. In the center of the track 20 is a hub 21 on which is mounted a motor 22 and reduction gearing 23 which terminate in the stationary gear 24 within the housing 25. Any other manner of rotating the hub 21 could be employed without departing from the spirit of this invention.

From the hub 21 radiates the tow arm 26 on which is mounted the round guide rods 27 on each of which is mounted a slide 28 to which is attached a tow rod 29 by means of a bolt 30.

The tow rod 29 slidably passes through the tubular arm 31 which is attached to the car spindle 32 which is joined by the tie bar 33 to the arm 34 of the spindle 35. The spindles 32 and 35 have the wheel spindles 44 projecting therefrom on which are mounted the front wheels 37 of the automobile 38.

The usual steering wheel 39 is connected by the steering wheel shaft 40 to the steering arm 41, which is joined to the steering link 42 by the spherical connecting bolt 43, shown in Fig. 4.

The wheels 37 are mounted on roller bearings 43 which are supported by the spindles 44, as shown in Fig. 12.

In Fig. 7 is shown a cross section of the fastening of the rear axle 45 between the frame parts 46 and 47 by means of a bolt 48.

In Fig. 8 is shown how the front axle 49 is held between the frame parts 50 and 51 by bolts 52 and 53.

In Fig. 9 is shown a section through the steering car spindle 32 and the lower portion of its bearing 54. A shock-absorbing spring is placed above each of the spindles 32 and 35.

The steering link 42 has attached thereto, near its connection to the steering arm 41, a tension spring 55 whose opposite end is secured by a bolt 56 to the body 57 of the car.

A buffer spring 58 is placed on the tow rod 29 between the end of the steering link 42 and the adjacent end of the tubular arm 31.

Figure 10:
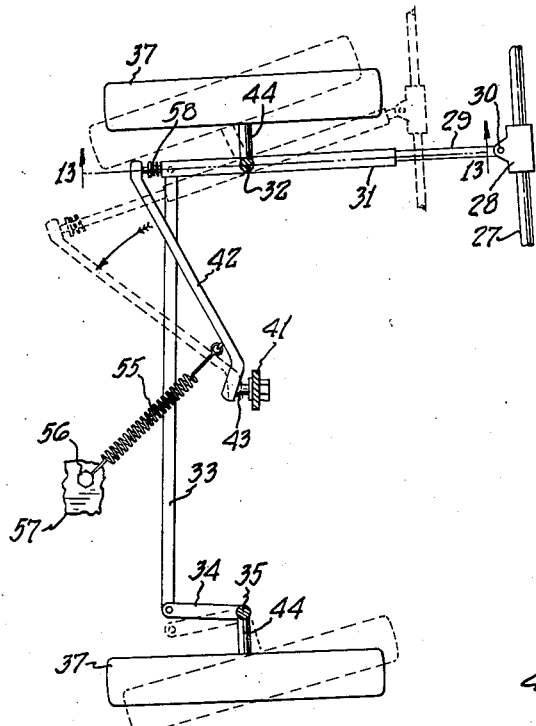
Fig. 10 is a diagrammatic view in plan showing why the wheels are turned toward the inner rail when the car slows down.
Figure 13:
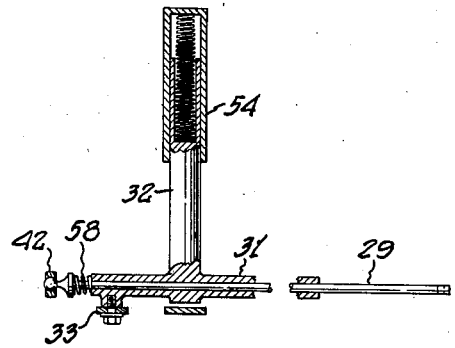
Fig. 13 is a section taken along the line 13—13 in Fig. 10.
Figure 11:
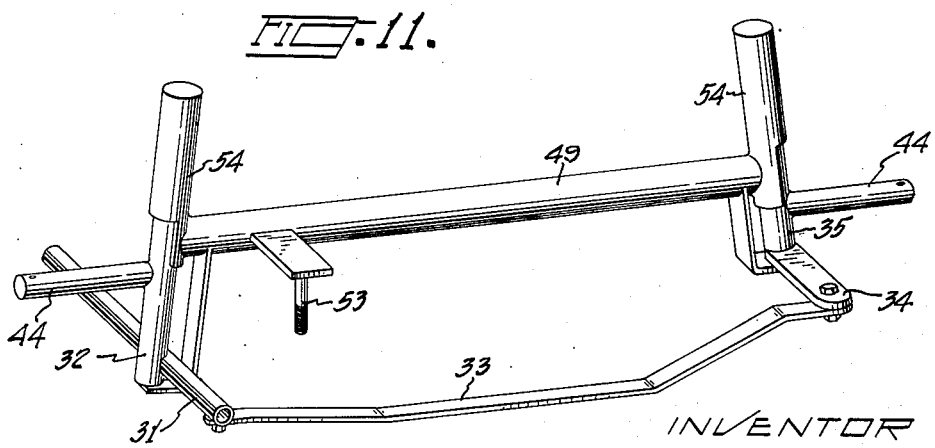
Fig. 11 is a perspective view of the front axle looking forwardly from the driver's position.

In Fig. 10 is shown, in full lines, a towing position and, in dotted lines, a rest position when the car is being towed by the tow bar. The tow arm 26 connects to the tow rod 29, which thrusts against the end of the tubular arm 31 of the car spindle 32. In this position, steering is accomplished by moving the steering arm 41, which is secured to the steering wheel shaft 40. Movement of this lever is transferred to the wheel spindles 44 through the link 42 and the tie bar 33.

When the power is cut off, the momentum of the car causes the tow rod 29 to move in the position shown in dotted lines in Fig. 10 and the spring 55 urges the wheel spindles 44 toward the position shown causing the car to run to the inner edge of the track 20. When in this position, movement of the arm 41 has no effect on the wheel spindles 44 and they will remain in this position until the power is applied and the tow rod 29 again returns to the position shown in full lines; that is, while the car is being towed under the control of the operator.

In Figs. 14 to 17, inclusive, is shown a preferred form of tow arm 26–A which is used in place of the arm 26 shown in the previous figures. The arm 26–A is tubular in form and is welded at one end to a tubular hub 59 which is hinged on the pin 60 mounted in the two lugs 61 on the hub 21. A brace 62 is provided between the hub 59 and the outer end of the tow arm 26–A which is radially positioned but can swing in a vertical plane.

Within the arm 26–A and against the hub 59 is placed a compression shock-absorbing spring 63 against which spring may rest a slotted head 64 in which is mounted a convex faced roller 65 on the pin 65–A which can roll along the interior of the tube 26–A and support one end of the plunger 66 on whose reduced outer end 67 is placed a second shock-absorbing spring 68. The end 67 passes between the rollers 69 which are mounted on the pins 70 which are supported in the head 71 and held by the screws 72–A. On the tip of the end 67 is secured a clip 72 to which the tow rod 29 is attached by the bolt 30.

With this type of arm, the bolt 30 may move radially in either direction until stopped by the springs 63 or 68.

From the foregoing, it can be seen that there is provided a unique and safe form of amusement device for children where the child's ability to maneuver the car is limited automatically to a period in which it is being towed under the control of the operator in charge, during which time he can steer it to any radial position on the track but he cannot collide with another car or pass it or be passed by another car.

The purpose of automatically steering the car toward the inside rail as it slows down is to prevent accidents like clearing the course of cars while the cars are being loaded or unloaded; that is, the cars are all parked against the inside rail instead of in various positions on the track where passengers could be injured in going to and from the cars and by the starting of the cars when people were on the track. The cars cannot be steered unless they are being towed; that is, when the pull on the tow rod 29 exceeds the urge of the spring 55 at the end of its leverage that is the outer end of the link 42.

I claim:

1. An amusement device having in combination a circular track, a plurality of towing arms radiating from the center of said track and revolvable above the plane of said track, each of said towing arms having a slide mounted thereon adapted to move radially across a portion of said track, a car mounted on said track behind the outer end of the towing arm, car spindles for said car, a tubular arm extending from one of the car spindles, a tow rod slidably extending through said tubular arm and joined to the slide on said tow arm, a steering wheel on said car and steering linkage to said car spindles, said linkage being connected to the rearmost end of said tow rod, and a spring attached to said car and to said linkage for urging said car to turn toward the innermost side of the track.

2. An amusement device having in combination a circular track, having a plurality of radial tow arms mounted to be driven above the center of said track with the outermost ends of said arms extending above said track, said arm having a slide thereon adapted to move radially across said track, a wheeled car mounted on said track having a steering wheel and a pair of steerable front wheels, linkage for transferring motion from said steering wheel to said steerable wheels including a car spindle for each steerable wheel, one of said car spindles having a tubular arm attached thereto, a tow rod attached to said slide and extending through said tubular arm and having its rearmost end attached to said linkage, a spring for urging said linkage to cause a left turn and a buffer spring on said tow bar between the rearmost end of said tubular arm and the adjacent end of said linkage.

3. An amusement device comprising a circular track in combination with a car mounted on said track, said car having car spindles for mounting the front wheels of the car, said spindles having steering linkage connected thereto, a towing arm mounted on the center of said track and having a slide thereon, said car having a tubular arm on one of its car spindles, and a tow rod connected to said slide, the other end of said rod passing through said tubular arm and connecting to the steering linkage of the car.

LEE U. EYERLY.

References Cited in the file of this patent

UNITED STATES PATENTS

| Number | Name | Date |
| --- | --- | --- |
| 1,549,927 | Sherry | Aug. 18, 1925 |
| 1,759,170 | Sherry | May 20, 1930 |
| 2,546,917 | Bergen | Mar. 27, 1951 |